US012237573B2

(12) United States Patent
Johnson

(10) Patent No.: US 12,237,573 B2
(45) Date of Patent: Feb. 25, 2025

(54) RESISTIVELY LOADED TIGHTLY COUPLED DIPOLE ARRAY ADDITIVELY MANUFACTURED MODULAR APERTURE

(71) Applicant: BAE SYSTEMS Information and Electronic Systems Integration Inc., Nashua, NH (US)

(72) Inventor: Alexander D. Johnson, Waltham, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 237 days.

(21) Appl. No.: 18/170,851

(22) Filed: Feb. 17, 2023

(65) Prior Publication Data

US 2024/0283144 A1 Aug. 22, 2024

(51) Int. Cl.
*H01Q 21/26* (2006.01)
*H01Q 1/38* (2006.01)
*H01Q 1/48* (2006.01)

(52) U.S. Cl.
CPC ................. *H01Q 1/38* (2013.01); *H01Q 1/48* (2013.01)

(58) Field of Classification Search
CPC ...... H01Q 1/38–48; H01Q 9/065; H01Q 9/16; H01Q 9/285; H01Q 21/06; H01Q 21/26
See application file for complete search history.

(56) References Cited

U.S. PATENT DOCUMENTS

| | | | | |
|---|---|---|---|---|
| 9,172,147 | B1 * | 10/2015 | Manry, Jr. | H01Q 1/286 |
| 10,320,088 | B1 | 6/2019 | Johnson et al. | |
| 10,333,230 | B2 | 6/2019 | Elsallal et al. | |
| 10,840,593 | B1 | 11/2020 | Johnson et al. | |
| 2016/0365641 | A1 | 12/2016 | Mayer et al. | |
| 2017/0025767 | A1 | 1/2017 | Elsallal et al. | |
| 2018/0310522 | A1 | 11/2018 | Bancroft et al. | |
| 2022/0037766 | A1 | 2/2022 | Varnoosfaderani et al. | |
| 2022/0328968 | A1 | 10/2022 | Johnson et al. | |

OTHER PUBLICATIONS

The MITRE Corporation. "ASI to Launch Cubesat Demo That Could Lead To Quicker Access To Satellite Data", (May 28, 2019), 3 pages.

Carvalho, et al, "Semi-Resistive Approach for Tightly Coupled Dipole Array Bandwidth Enhancement", IEEE Open Journal of Antennas and Propagation, Dec. 25, 2020, 8 pages.

(Continued)

*Primary Examiner* — Hasan Islam
(74) *Attorney, Agent, or Firm* — Scott J. Asmus

(57) ABSTRACT

An antenna assembly includes an antenna feed configured to receive a signal over a wide bandwidth, a ground plane, and an antenna element. The antenna element includes first and second conductive dipole arms each in planar alignment with a surface of the ground plane and adjacent to each other. The antenna assembly further includes a conductive wall ("H-wall") in electrical communication with the ground plane and having an end adjacent to, and physically separate from, the second conductive dipole arm, where an axial length of the H-wall being orthogonal to the ground plane, and a resistive surface having an attenuation effect on the reflected signal from the ground plane.

20 Claims, 12 Drawing Sheets

(56) References Cited

OTHER PUBLICATIONS

Johnson, et al, "Phased Array with Low Angle Scanning and 46:1 Bandwidth", IEEE Transactions on Antennas and Propagation, IEEE Xplore, retrieved Jun. 17, 2020, 9 pages.
Targonski, et al, "Design of Wide-Band Aperture-Stacked Patch Microstrip Antennas", IEEE Transactions on Antennas and Propagation, vol. 46, No. 9, Sep. 1998, 7 pages.
Logan, et al, "A New Class of Planar Ultrawideband Modular Antenna Arrays With Improved Bandwidth", IEEE Transactions on Antennas and Propagation, vol. 66, No. 2, Feb. 2018, 10 pages.
Holland, et al, "A 7-21 GHz Dual-Polarized Planar Ultrawideband Modular Antenna (PUMA) Array", IEEE Transactions on Antennas and Propagation, vol. 60, No. 10, Oct. 2012, 12 Pages.
Sekelsky, et al, "Ultra-wideband Dual-Polarized Scanning Metamaterial / Meta-ferrite Arrays*", IEEE Xplore, retrieved Jun. 17, 2020, 4 pages.
Doane, et al, "A Wideband, Wide Scanning Tightly Coupled Dipole Array With Integrated Balun (TCDA-IB)", IEEE Transactions on Antennas and Propagation, vol. 61, No. 9, Sep. 2013, 11 pages.
International Search Report, PCT/US24/15501, mailed May 21, 2024, 9 pages.

* cited by examiner

RESISTIVELY LOADED TIGHTLY COUPLED DIPOLE ARRAY ADDITIVELY MANUFACTURED MODULAR APERTURE

FIELD OF DISCLOSURE

The present disclosure relates to antennas, and more particularly, to resistively loaded additively manufactured modular aperture antennas and antenna arrays.

BACKGROUND

An antenna transduces electromagnetic (EM) waves to radio frequency (RF) electrical signals. An aperture is typically considered as the portion of a surface of an antenna through which a majority of the EM waves are transmitted or received. Antennas can be arranged in arrays to provide wideband and ultra-wideband (UWB) operations, such as in conjunction with radar and tracking systems, high data rate communication links, and multi-waveform, multi-function front end systems.

Figure 1:
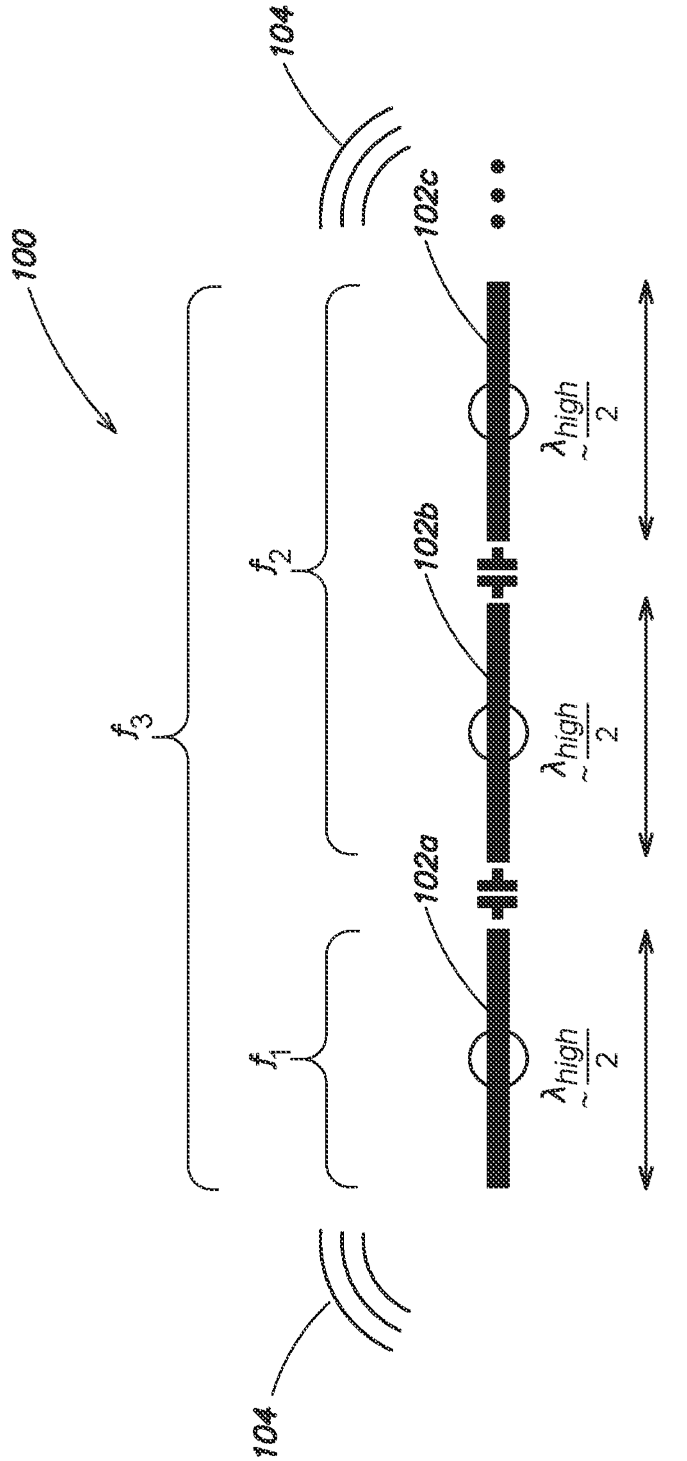
FIG. 1 is a schematic diagram of a tightly coupled dipole array ("TCDA"), in accordance with an embodiment of the present disclosure.

Although the following detailed description will proceed with reference being made to illustrative examples, many alternatives, modifications, and variations thereof will be apparent in light of this disclosure.

DETAILED DESCRIPTION

In accordance with an example of the present disclosure, an antenna assembly includes an antenna feed configured to receive a signal over a wide bandwidth, a ground plane, and an antenna element. The antenna element includes a first conductive dipole arm in planar alignment with a surface of the ground plane and a second conductive dipole arm in planar alignment with the surface of the ground plane and adjacent to the first conductive dipole arm. The antenna assembly further includes a conductive wall ("H-wall") in electrical communication with the ground plane and having an end adjacent to, and physically separate from, the second conductive dipole arm, where an axial length of the H-wall being orthogonal to the ground plane. The antenna assembly further includes a resistive card to attenuate the out of phase portions of a signal over a wide bandwidth reflected from the ground plane.

In some examples, the assembly includes an integral element additively manufactured into a single continuous piece of material. For example, the integral element includes the ground plane, the first conductive dipole arm, the second conductive dipole arm, the first feedline, the second feedline, and the H-wall. The integral element includes an electrically conductive material or a non-conductive material plated with an electrically conductive material. In some examples, the assembly further includes a non-conductive structural support, such as a dielectric foam or resin, surrounding integral element. The non-conductive structural support provides mechanical stability for the integral element and can also include sacrificial features that can be removed during fabrication of the assembly. For example, the assembly can be manufactured using any suitable additive or subtractive manufacturing process, including, but not limited to, 3-D printing, casting, computer numerical control (CNC), or the like. In some examples, the assembly can be manufactured as a single continuous unit or structure. In some other examples, individual components of the assembly can be manufactured separately and assembled. According to another example, the assembly can include any suitable material encased in, coated with, or otherwise covered with a conductive material, such as a conductive metal or the like to provide a conductive metal surface. For example, the assembly can include a plastic core with a conductive surface coating thereon.

Overview

As noted above, antennas can be arrayed to provide wideband and ultra-wideband operation and higher gain. The bandwidth ratio is expressed as a function of the upper frequency band of the antenna divided by the lower frequency band of the antenna. Ultra-wideband operation is typically considered to include antenna arrays having a bandwidth ratio of 6:1 or greater, also referred to herein as a technology for transmitting information across a wide bandwidth. An example of such an antenna array includes a tightly coupled dipole array (TCDA), the aperture of which includes a cluster of closely spaced dipole elements extending from a ground plane. For instance, a multifunction array (MFA) aperture is a use case of TCDA for UWB operation and a large field of view (FOV).

Example TCDA

FIG. 1 is a schematic diagram of a TCDA 100, in accordance with an embodiment of the present disclosure. The TCDA 100 includes multiple half wave dipole antennas 102*a*, 102*b*, 102*c*, etc. Each dipole antenna 102*a*, 102*b*, 102*c*, can radiate or receive a signal 104 at a frequency of approximately $$\frac{\lambda_1}{2}, \frac{\lambda_2}{2}, \text{and } \frac{\lambda_3}{2},$$

respectively. An individual dipole antenna, such as dipole antenna 102*a*, radiates or receives a signal at a frequency $f_1$. The dipole antennas 102*a*, 102*b*, 102*c* can be located or arrayed adjacent to each other to radiate or receive signals at frequencies $f_2$, $f_3$, etc., such as shown in FIG. 1. Such an arrangement approximates a near-linear current distribution across all of the dipole antennas 102*a*, 102*b*, 102*c*.

Figure 2:
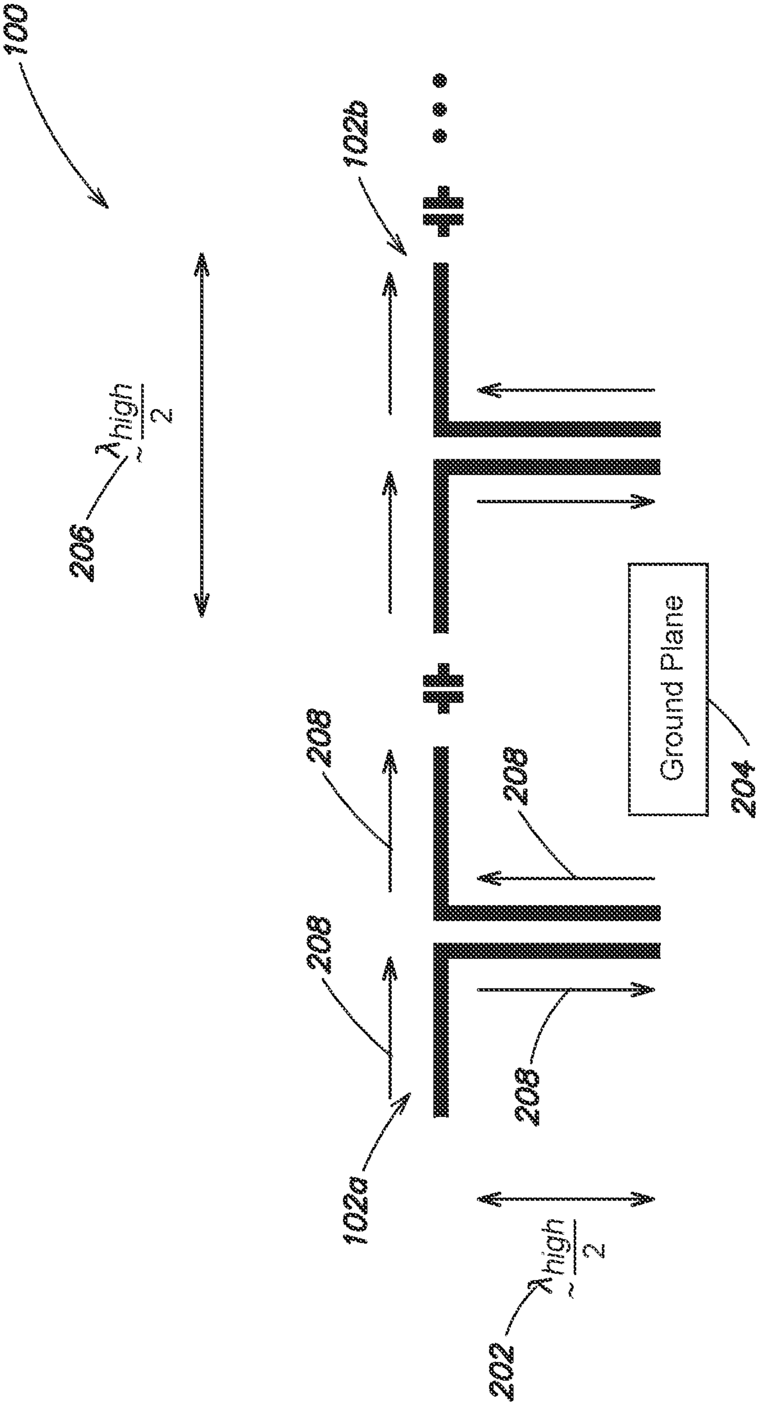
FIG. 2 is another schematic diagram of the TCDA of FIG. 1, in accordance with an example of the present disclosure.

FIG. 2 is another schematic diagram of the TCDA 100 of FIG. 1, in accordance with an example of the present disclosure. The upper cutoff frequency of the TCDA 100 is established by an array pitch (element width) 206 of each of the antennas 102*a*, 102*b* and is affected by the height 202 of the dipole elements above a ground plane 204. The lower cutoff frequency can be extended by coupling each of the antennas 102*a*, 102*b* or through the presence of dielectric loading in the substrate and is affected by the height 202 of the dipole elements above a ground plane 204.

TCDAs can be fed by balanced or unbalanced feed structures. Some existing TCDAs have wideband, single-ended (unbalanced) feeds while others have differential (balanced) feeds. For example, in a single-ended dipole arrangement, one dipole arm is energized by the signal while the other dipole arm is shorted to a ground potential. By contrast, a balanced feed antenna has complementary signals 208 in the adjacent conductive elements, such as shown in FIG. 2.

TCDA of both feeding types can suffer from common mode resonances, which affect antenna performance. For example, a signal radiating from one or more of the dipole antennas 102*a*, 102*b* can excite a common mode resonance upon a balanced feed of the adjacent dipole antenna(s) 102*a*, 102*b* when scanning in the ground plane 204 over a wide or ultra-wideband frequency range. The common mode resonance radiating from the antenna can interfere with and alter the phase of the signal on the feed line (also referred to as signal coupling), creating an unbalanced current that degrades the signal strength and reduces antenna efficiency. Thus, there are various methods to eliminate common mode resonances, including H-walls and shorting posts.

TCDA design is a multi-faceted balancing act of parameters that require deep understanding of electromagnetic phenomenon. High bandwidth TCDAs enable the antenna to perform several functions (e.g., transmit and receive several signals across a wide range of frequencies) at a single aperture. To achieve these functions efficiently, the antenna are often designed to reduce losses. However, lossless TCDA are limited in bandwidth by physical constraints, requiring lossy loading to be employed in some scenarios.

Thus, there is a need for a TCDA antenna that is easily scalable and can trade an ultra-wide bandwidth versus incurred losses.

Example Modular Antenna Array

Figure 3A:
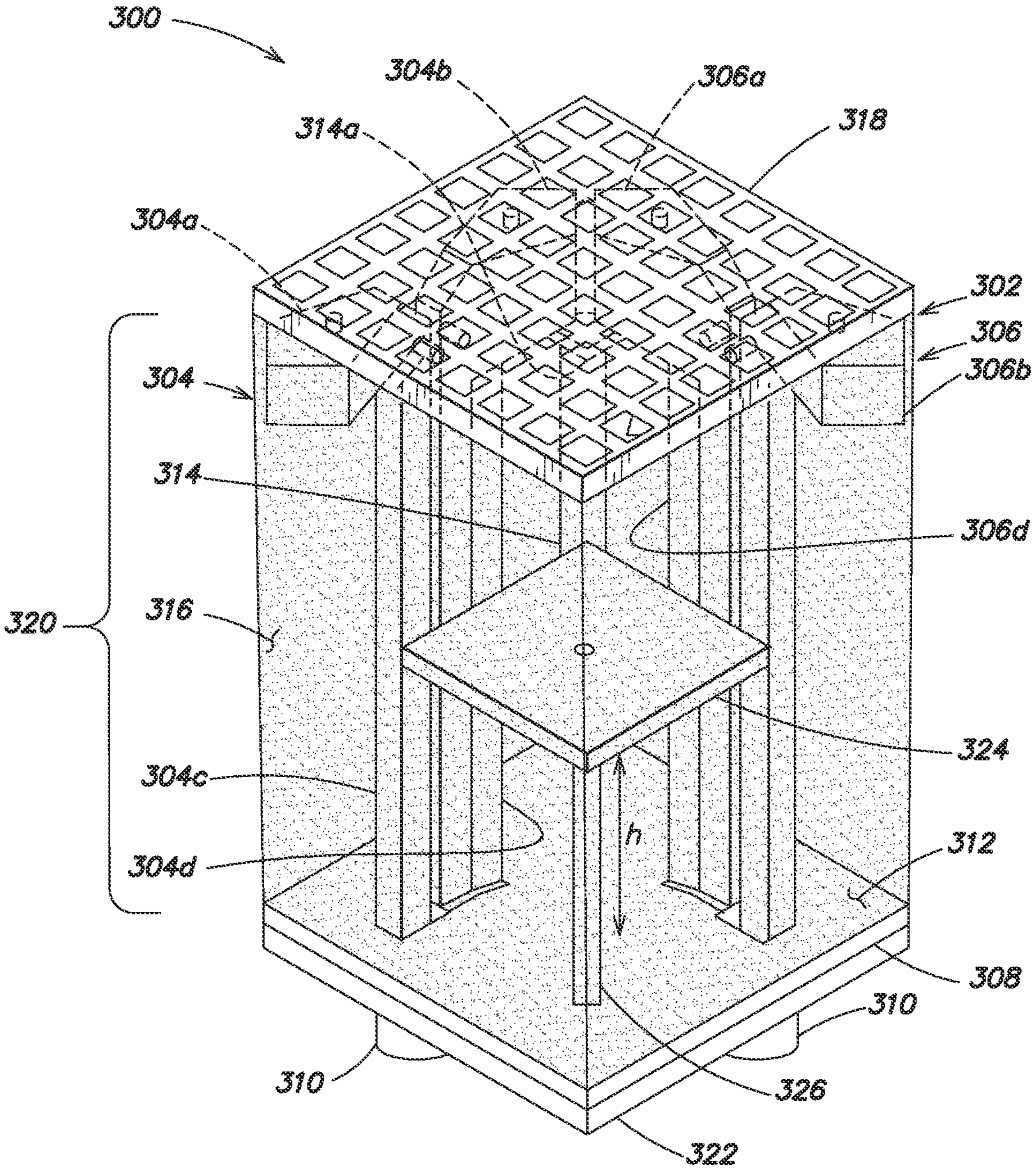
FIGS. 3A-B are top isometric perspective views of a modular antenna, according to an example of the present disclosure.
Figure 3B:
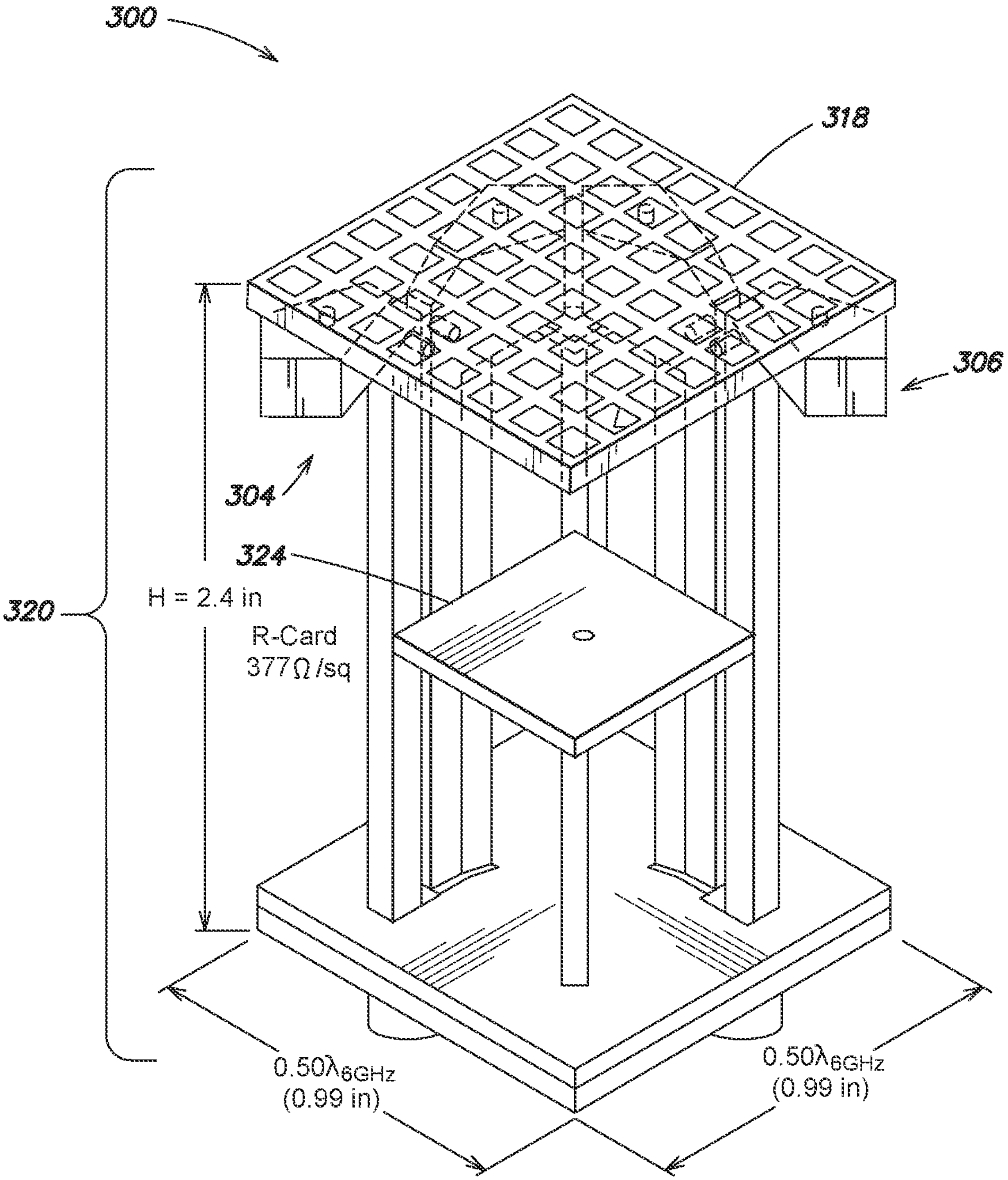

FIGS. 3A-B are top isometric perspective views of a modular antenna 300, according to an example of the present disclosure. The antenna 300 includes a 1×1 unit cell 302. The antenna 300 can, in some examples, include multiple unit cells arrayed together, such as 3×3, 6×6, etc., where each unit cell is similar to the 1×1 unit cell 302 shown in FIGS. 3A-B. In any event, the antenna 300 includes one or more 1×1 unit cells 302.

Figure 4A:
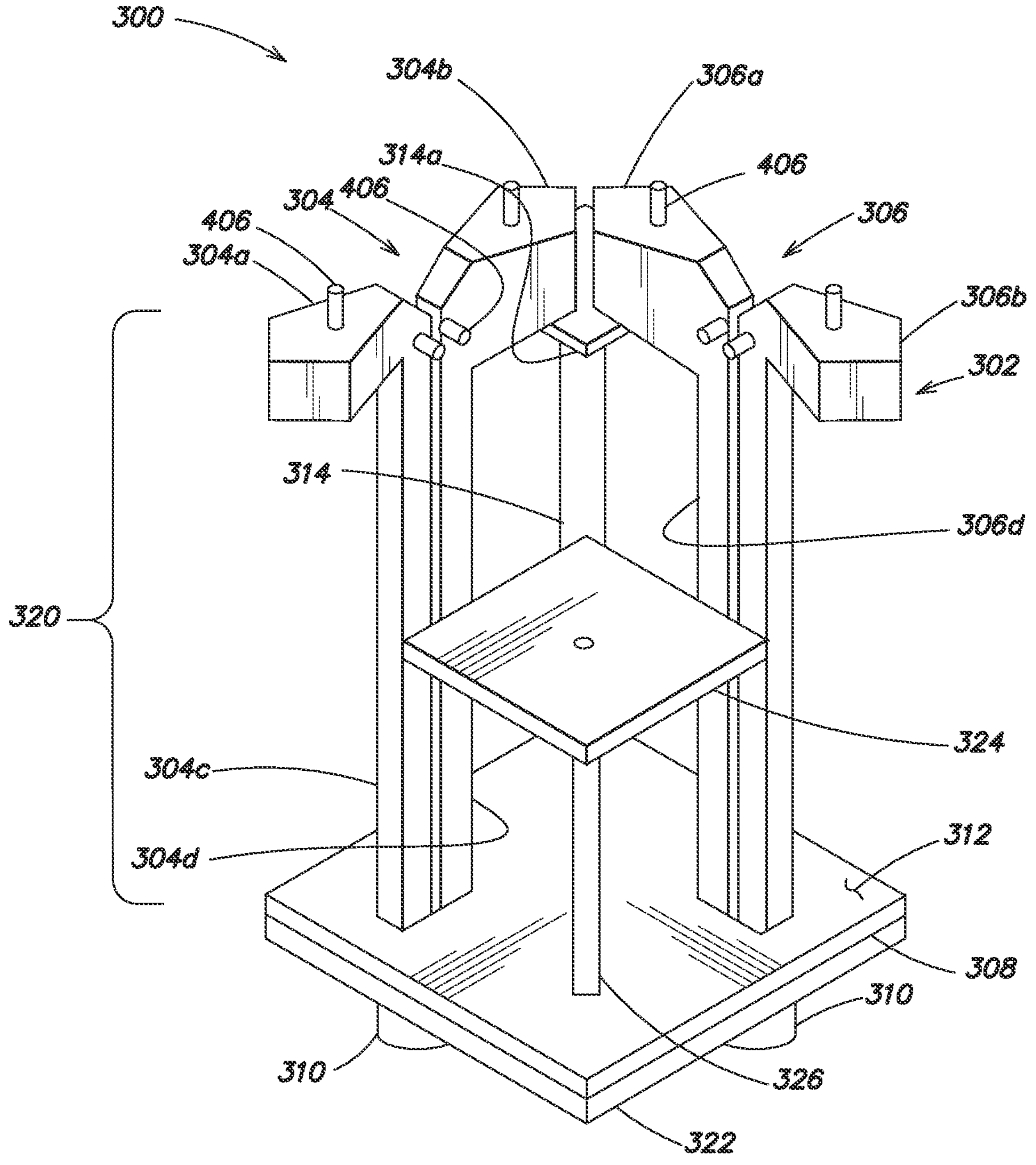
FIGS. 4A-F are top isometric perspective views of various structures during several stages of fabrication of the modular antenna of FIG. 3A, in accordance with an example of the present disclosure.
Figure 4B:
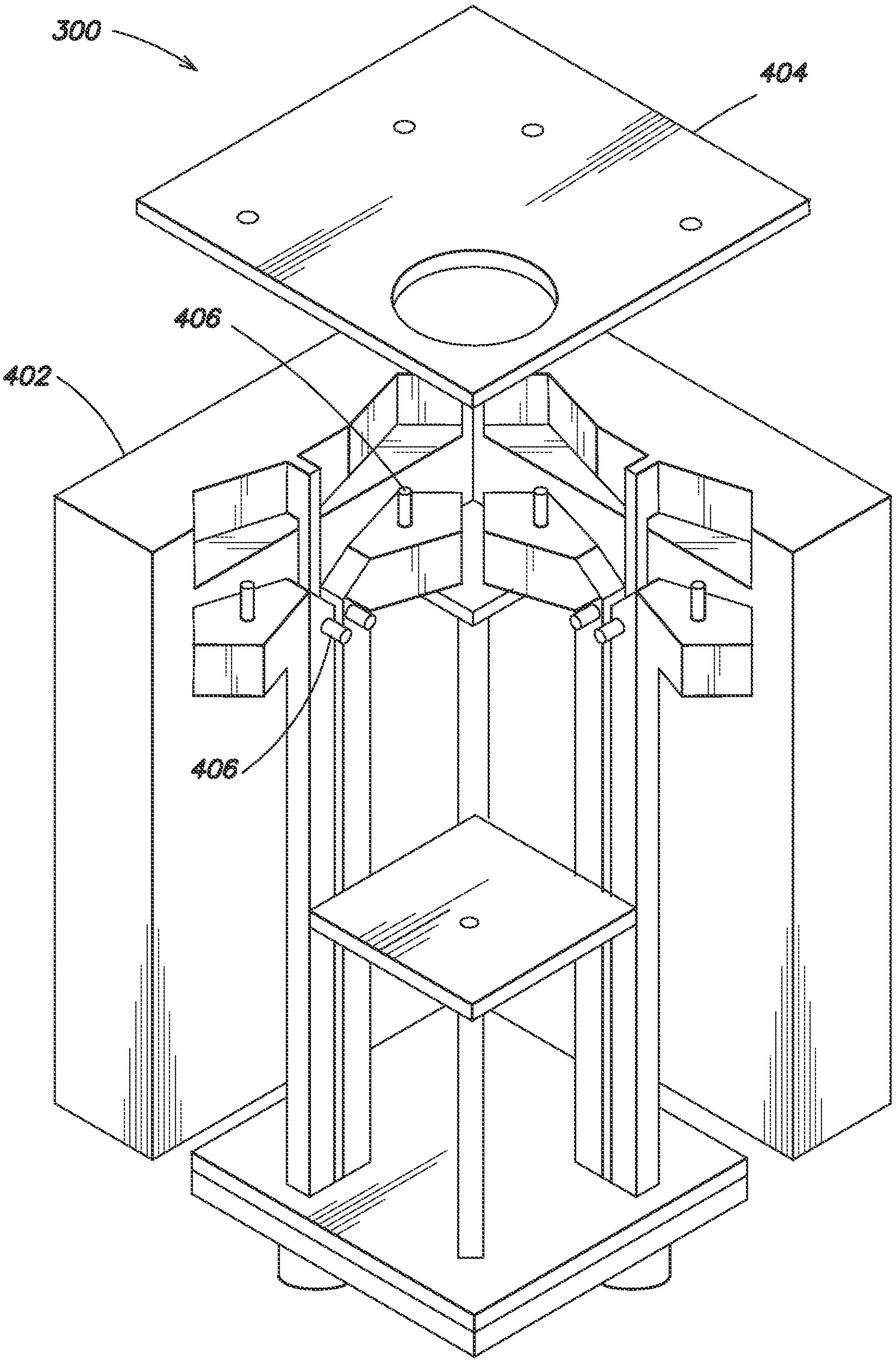
Figure 4C:
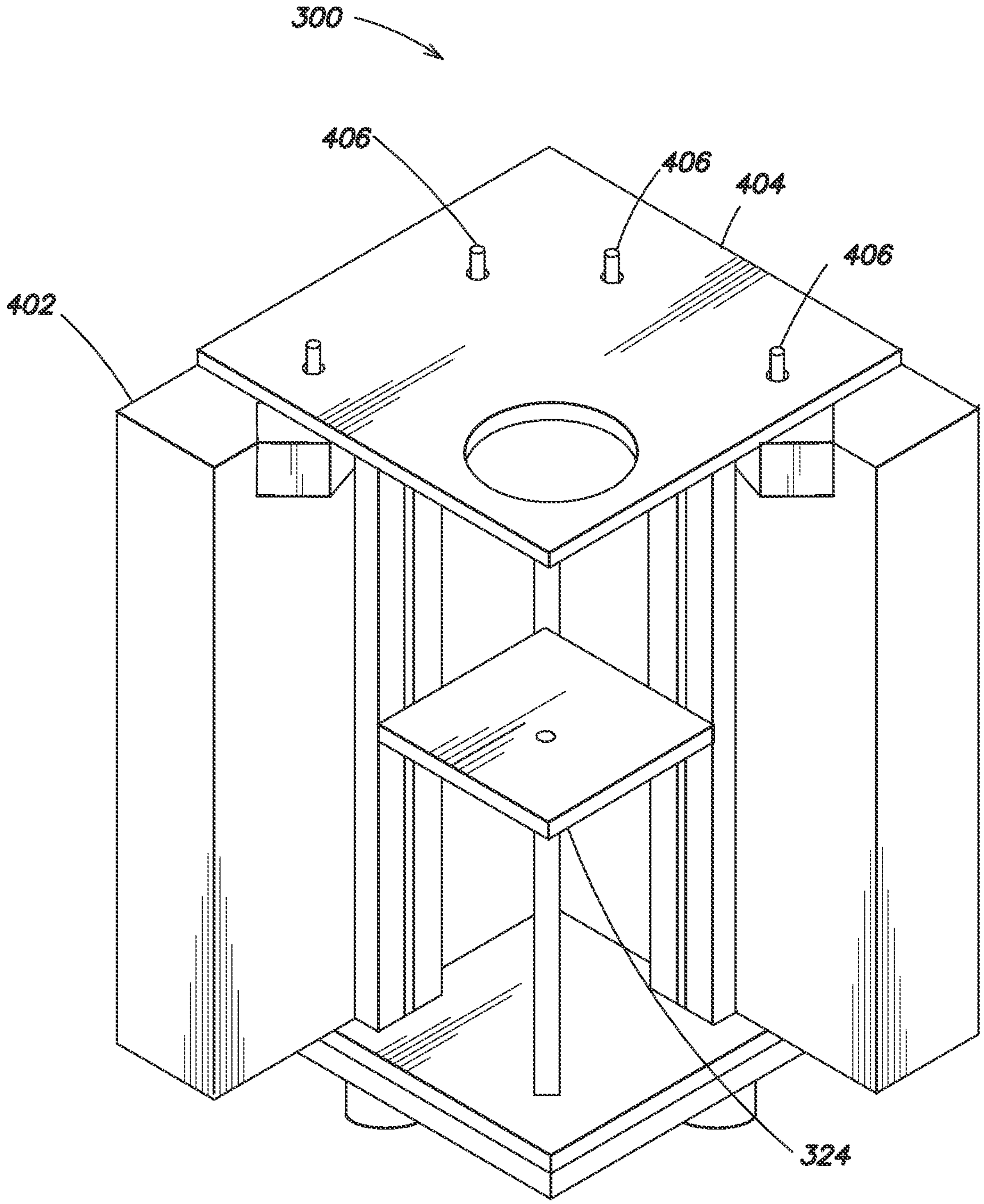
Figure 4D:
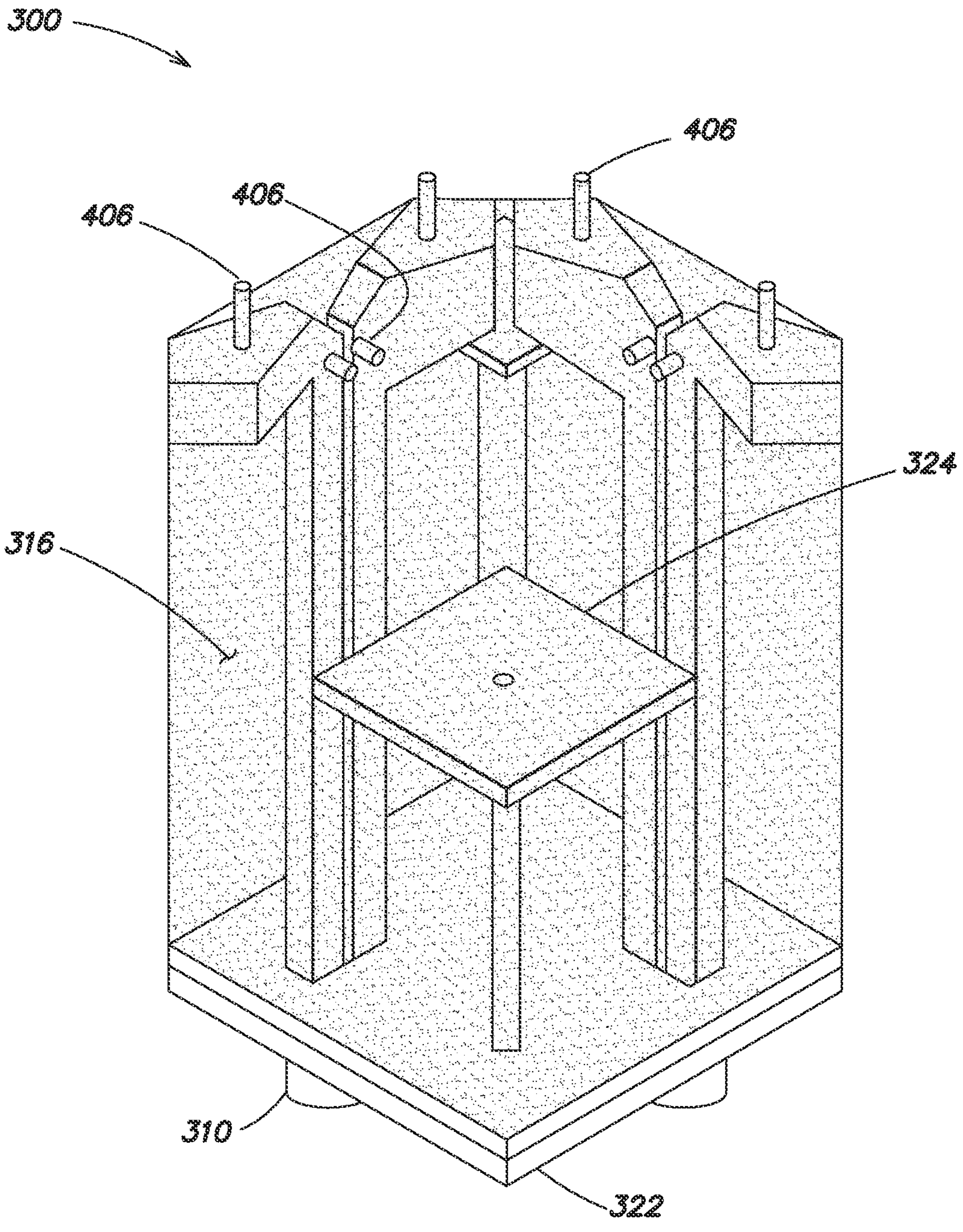
Figure 4E:
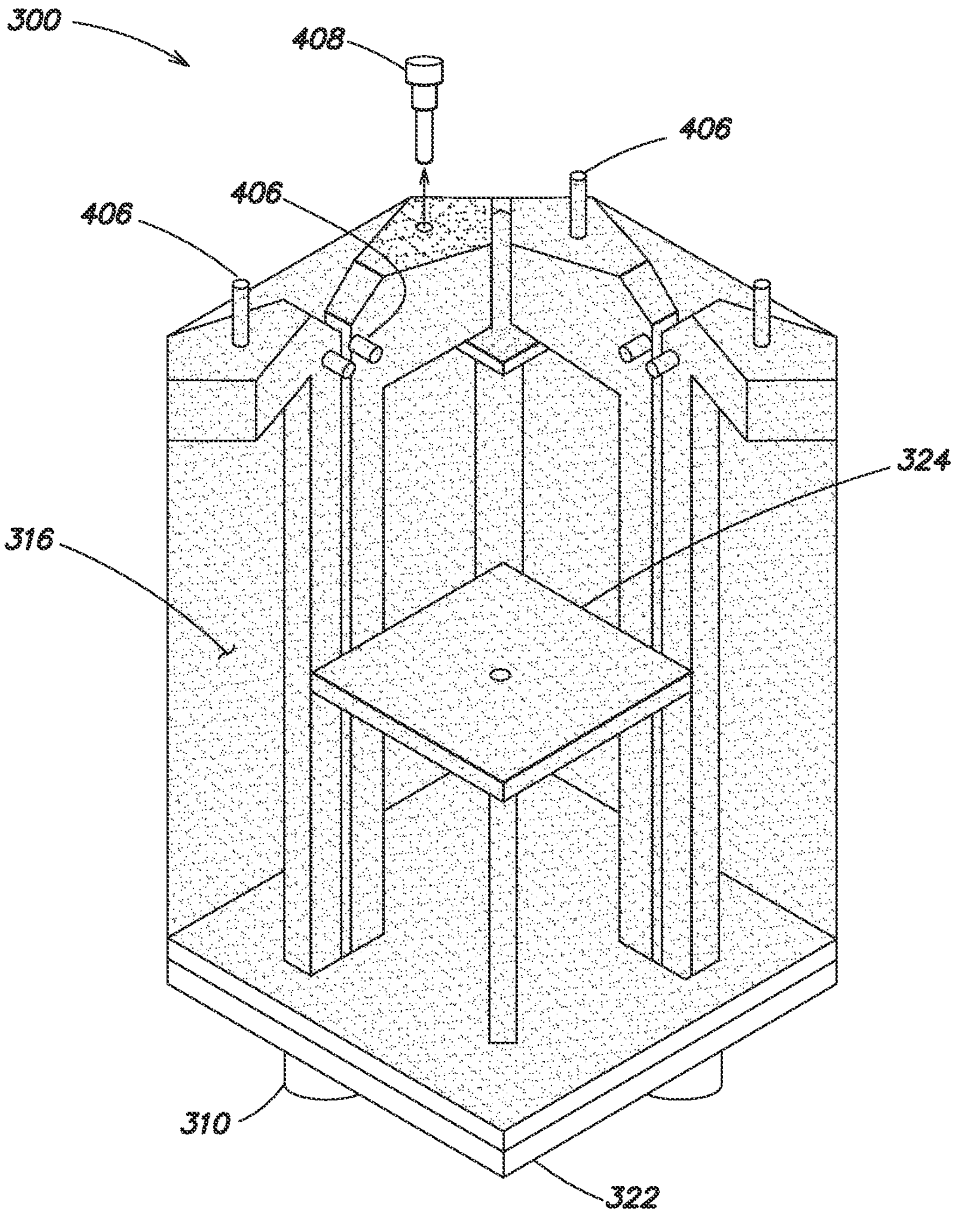
Figure 5:
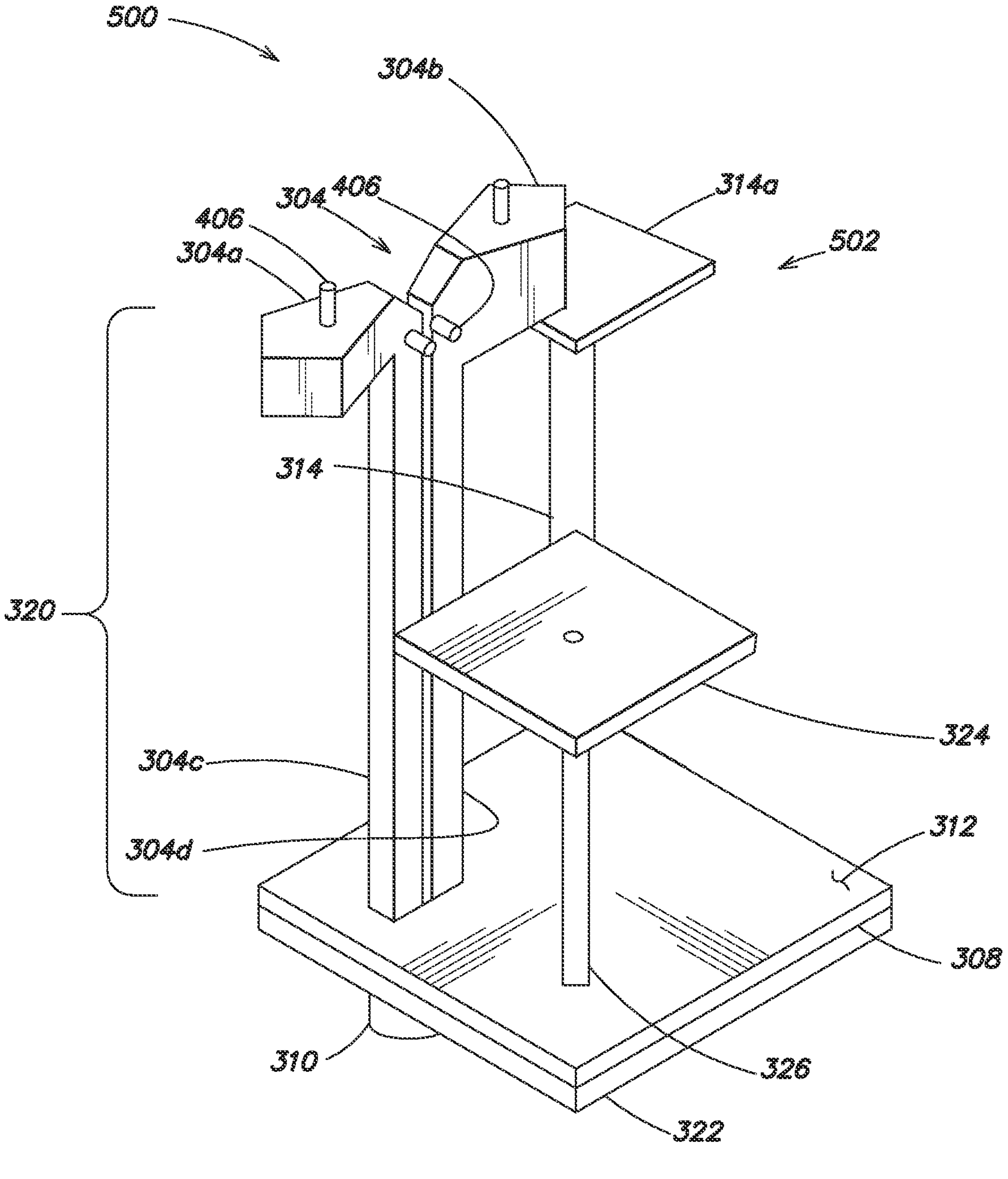
FIG. 5 is a top isometric perspective view of a modular antenna, according to another example of the present disclosure.

Referring to FIGS. 3A and 4A, the unit cell 302 includes a first antenna element 304, a second antenna element 306, a ground plane 308, and at least one antenna feed 310. A surface of the first antenna element 304 and/or the second antenna element 306 includes at least a portion of an aperture of the modular antenna 300. It will be understood that in some examples, it is not necessary to include both the first and second antenna elements 304, 306. For example, FIG. 5 shows a modular antenna 500 with a unit cell 502 including a single antenna element 304 (with corresponding elements as described herein) for single linear polarization, in accordance with an example of the present disclosure. In some other examples, such as shown and described with respect to FIGS. 3A and 4A, the unit cell 302 includes both the first and second antenna elements 304, 306 (e.g., two orthogonal arrays) for dual polarization. The at least one antenna feed 310 can be single-ended or balanced and, accordingly, is configured to receive a single-ended (unbalanced) or a differential (balanced) signal. Each antenna element 304, 306 includes a first conductive dipole arm 304*a*, 306*a* and a second conductive dipole arm 304*b*, 306*b*. The first conductive dipole arm 304*a*, 306*a* and the second conductive dipole arm 304*b*, 306*b* are each in planar alignment with a surface 312 of the ground plane 308. In some examples, the first conductive dipole arm 304*a*, 306*a* is a mirror image of the second conductive dipole arm 304*b*, 306*b* about a longitudinal axis extending perpendicular to the surface 312 of the ground plane 308, such that the first conductive dipole arm 304*a*, 306*a* is parallel and adjacent to the respective second conductive dipole arm 304*b*, 306*b*. Further, the second conductive dipole arm 304*b* of the first antenna element 304 is parallel and adjacent to the first conductive dipole arm 306*a* of the second antenna element 306. Each antenna element 304, 306 further includes a first feedline 304*c*, 306*c* in electrical communication with the first conductive dipole arm 304*a*, 306*a* and the antenna feed 310, and a second feedline 304*d*, 306*d* in electrical communication with the second conductive dipole arm 304*b*, 306*b* and the antenna feed 310.

The unit cell 302 further includes a conductive wall ("H-wall") 314 in electrical communication with the ground plane 308. The H-wall 314 has an end 314*a* adjacent to, and physically separate from, the second conductive dipole arm 304*b* of the first antenna element 304 and the first conductive dipole arm 306*a* of the second antenna element 306. An axial length of the H-wall 314 is orthogonal to the ground plane 308. In other words, the H-wall 314 extends orthogonally from the ground plane 308 toward the second conductive dipole arm 304*b* of the first antenna element 304 and the first conductive dipole arm 306*a* of the second antenna element 306. The H-wall 314 does not physically contact the first or second antenna elements 304, 306. Rather, the H-wall 314 disrupts the common mode resonances (e.g., the coupled signal between adjacent unit cells 302) that would otherwise cause feed line radiation/coupling and reduce antenna efficiency. As a result, the H-wall 314 enables efficient radiation from the first and second conductive dipole arms 304*a*, 304*b*, 306*a*, 306*b* without added losses such that a bandwidth ratio of the antenna aperture can reach 10:1 (e.g., between approximately 2-20 GHz) for balanced operation while using a differential feed and without a balun or other components for mitigating the common mode resonances.

Further bandwidth expansion can be achieved using a resistive (lossy or reflective) surface ("R-card") in conjunction with the H-wall, such as described below. For example, the unit cell 302 can further include a feed structure 322 and an R-card 324 located between the ground plane and the antenna element. The feed structure 322 can include, for example, a printed metal retaining plate that holsters one or more RF connectors at the antenna feed 310 to the first and second feedlines 304*c*, 306*c* and 304*d*, 306*d*. Signals passing through that R-card 324 acquire an initial transmission phase delay on the first pass and an additional transmission phase delay on the second pass after reflecting off of the ground plane. The R-card 324 can, for example, extend the bandwidth of the aperture to 15:1 for signals between approximately 0.4-6 GHz. The efficiency of the unit cell 302 is a function of the height, shape, and resistance of the R-card 324, and thus the unit cell 302 can be modified such that efficiency is lowest at frequencies of least importance for a given application. The R-card 324 can, in some examples, include a square shaped frequency selective surface or a differently shaped frequency selective surface, such as annular rings. In some examples, the R-card 324 has a resistance of approximately 377 Ω/square inch. The R-card 324 is located a height h above the ground plane 308. The R-card 324 can be mounted, for example, on a post 326 attached to the ground plane 308 or another structural element.

In some examples, the unit cell 302 further includes at least one non-conductive structural support element 316 between the ground plane 308 and the first feedline 304*c*, 306*c*, the second feedline 304*d*, 306*d*, or both feedlines 304*c*, 306*c*, 304*d*, 306*d* of the first and second antenna elements 304, 306, respectively. In some examples, the at least one non-conductive structural support element 316 includes a dielectric foam or resin surrounding the antenna elements 304 and 306. The at least one non-conductive structural support element 316 provides mechanical stability for the first antenna element 304 and/or the second antenna element 306 and can also include sacrificial features that can be removed during fabrication of the unit cell 302, such as during an additive manufacturing process where components of the unit cell 302 (e.g., the ground plane 308, the feedlines 304*c*, 304*d*, 306*c*, 306*d*, and the dipole arms 304*a*, 304*b*, 306*a*, 306*b*) are fabricated by the successive addition of material (e.g., via a three-dimensional printing or other deposition process).

In some examples, the first conductive dipole arms 304*a*, 306*a* are linearly polarized with respect to a first plane of polarization (e.g., V-pol), and the second conductive dipole arms 304*b*, 306*b* are linearly polarized with respect to a second plane of polarization (e.g., H-pol), where the first plane of polarization is orthogonal to the second plane of polarization.

In operation, a signal, such as an analog RF signal, can propagate between the first conductive dipole arms 304*a*, 306*a* and the antenna feed 310 via the first feedline 304*c*, 306*c*. The signal can further propagate between the second conductive dipole arms 304*b*, 306*b* and the antenna feed 310 via the second feedline 304*d*, 306*d*. The antenna feed 310 can include a positive terminal and a negative terminal coupled to the first feedline 304*c*, 306*c* and the second feedline 304*d*, 306*d*, respectively, or vice versa. In some examples, a signal at the positive terminal is 180 degrees out-of-phase with a signal at the negative terminal (i.e., balanced or complementary signals).

In some examples, the unit cell 302, or an array of unit cells 302, is covered by a substrate 318 or another overlay material. The substrate 318 can include dielectric or other impedance matching materials to provide physical protection and temperature resilience for the modular antenna 300, and/or to increase power transfer and reduce signal reflection into and out of the modular antenna 300.

Referring to FIG. 3B, the dimensions of the unit cell 302, in accordance with an example for a 6 GHz application, can be approximately 0.99 inches wide by 0.99 inches deep by 1.74 inches high, or approximately 0.50λ (wavelength of signal) by 0.50λ by 0.87λ.

Modular Antenna Array Fabrication

FIGS. 4A-F are top isometric perspective views of various structures during several stages of fabrication of the modular antenna 300 of FIG. 3, in accordance with an example of the present disclosure. In general, the modular antenna 300, including one or more unit cells 302 or portions thereof, is printed or otherwise fabricated using additive manufacturing techniques. It will be understood that any number of the unit cells 302 can be fabricated in the disclosed manner, for example, as component arrays (i.e., a single unit cell 302), blocks of sub-arrays (i.e., multiple adjacent unit cells 302), or complete arrays of the unit cells 302.

Portions of the modular antenna 300 and certain other structural or sacrificial components are fabricated by additively depositing or printing material to form the various structures of the antenna, such that the product is formed from a single piece of continuous material, also referred to as an integral element 320. The integral element 320 includes, for example, the first antenna element 304, the second antenna element 306, and the H-wall 314. In some examples, the material is at least partially electrically conductive (e.g., it is all metal or at least partially metal). In some other examples, the material is at least partially non-conductive and at least partially plated with another conductive material (e.g., a metal plating).

In some examples, the modular antenna 300 further includes the resistive surface ("R-card") 324 located between the ground plane and the antenna element. As discussed above, the R-card 324 is a dielectric surface with a resistive coating that simulates a ground plane above a cut-off frequency of the coating. The R-card 324 can, in some examples, include a square shaped frequency selective surface or a differently shaped frequency selective surface, such as annular rings. In some examples, the R-card 324 has a resistance of approximately 377 Ω/square inch. The R-card 324 is located a height h above the ground plane 308. The R-card 324 can be separate from the integral element 320, that is, not formed from the same single piece of continuous material as the integral element 320.

In some examples, the at least one non-conductive structural support element 316 can include a low dielectric foam or resin that is added to voids around the additively fabricated material of the antenna components. The foam or resin provides shock and vibration mitigation or other mechanical support of the antenna components, such as the first conductive dipole arm 304*a*, 306*a*, the second conductive dipole arm 304*b*, 306*b*, the first feedline 304*c*, 306*c*, and/or the second feedline 304*d*, 306*d*. In some examples, a perimeter caul plate 402 and a perforated top plate 404 can be placed around at least a portion of the modular antenna 300 to contain the at least one non-conductive structural support element 316 during fabrication and prior to baking or setting the foam or resin into a semi-solid state.

Figure 4F:
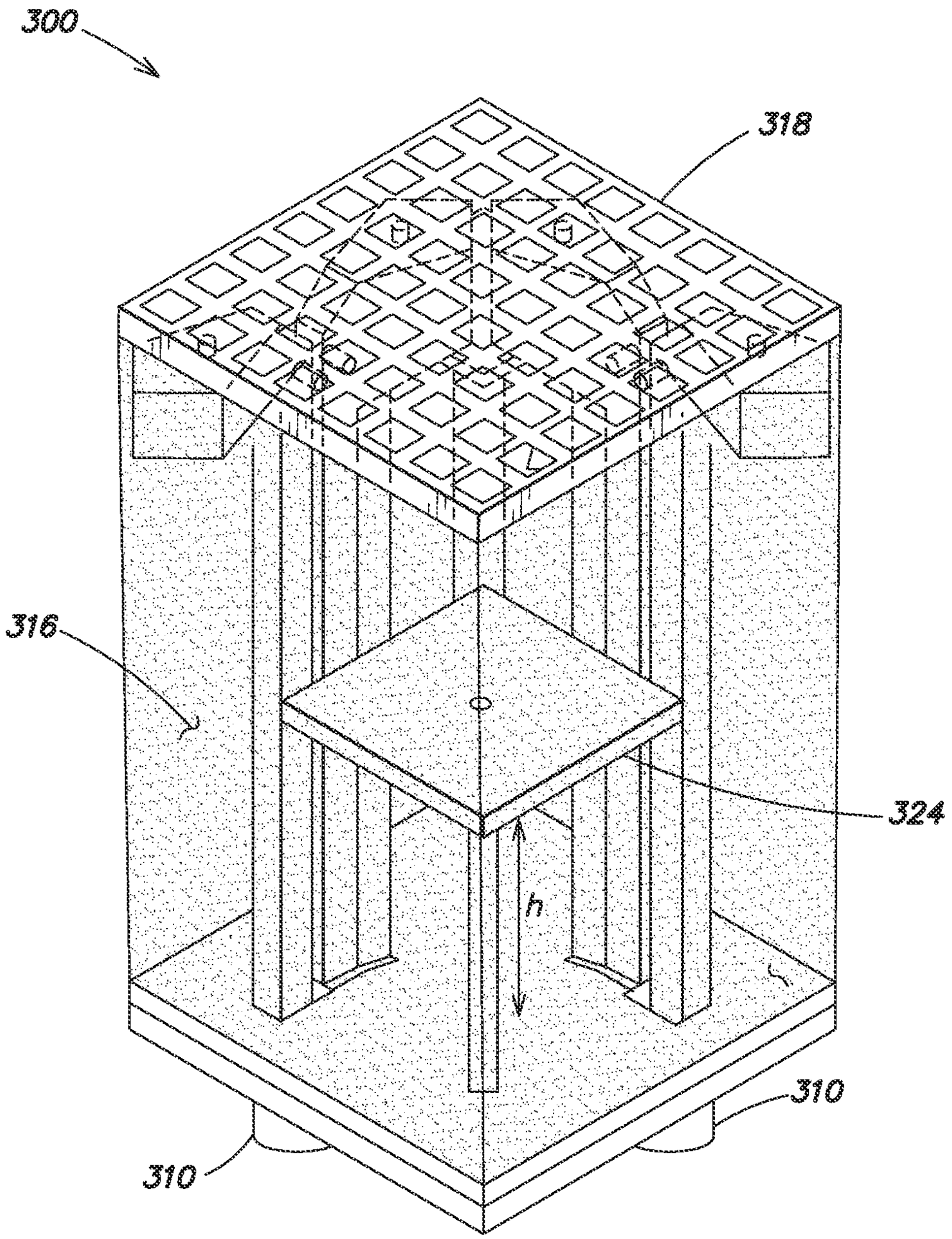

In some examples, such as shown in FIGS. 4A-D, one or more mechanical alignment structures 406 are fabricated in conjunction with one or more antenna components, including, for example, the first conductive dipole arm 304*a*, 306*a*, the second conductive dipole arm 304*b*, 306*b*, the first feedline 304*c*, 306*c*, and the second feedline 304*d*, 306*d*. The alignment structures 406 align the top plate 404 with the first conductive dipole arm 304*a*, 306*a*, the second conductive dipole arm 304*b*, 306*b*, prior to baking or otherwise setting the foam or resin in the at least one non-conductive structural support element 316. Once set, at least a portion of the at least one non-conductive structural support element 316 provides structural support for the first conductive dipole arm 304*a*, 306*a*, the second conductive dipole arm 304*b*, 306*b*. Other portions of the at least one non-conductive structural support element 316 and any mechanical alignment structures 406 not needed for structural support can then be machined or otherwise removed, such as shown at 408 in FIG. 4E. In some examples, a superstrate, such as the substrate 318, or other overlay material can be attached to the modular antenna 300, such as shown in FIG. 4F.

Figure 4G:
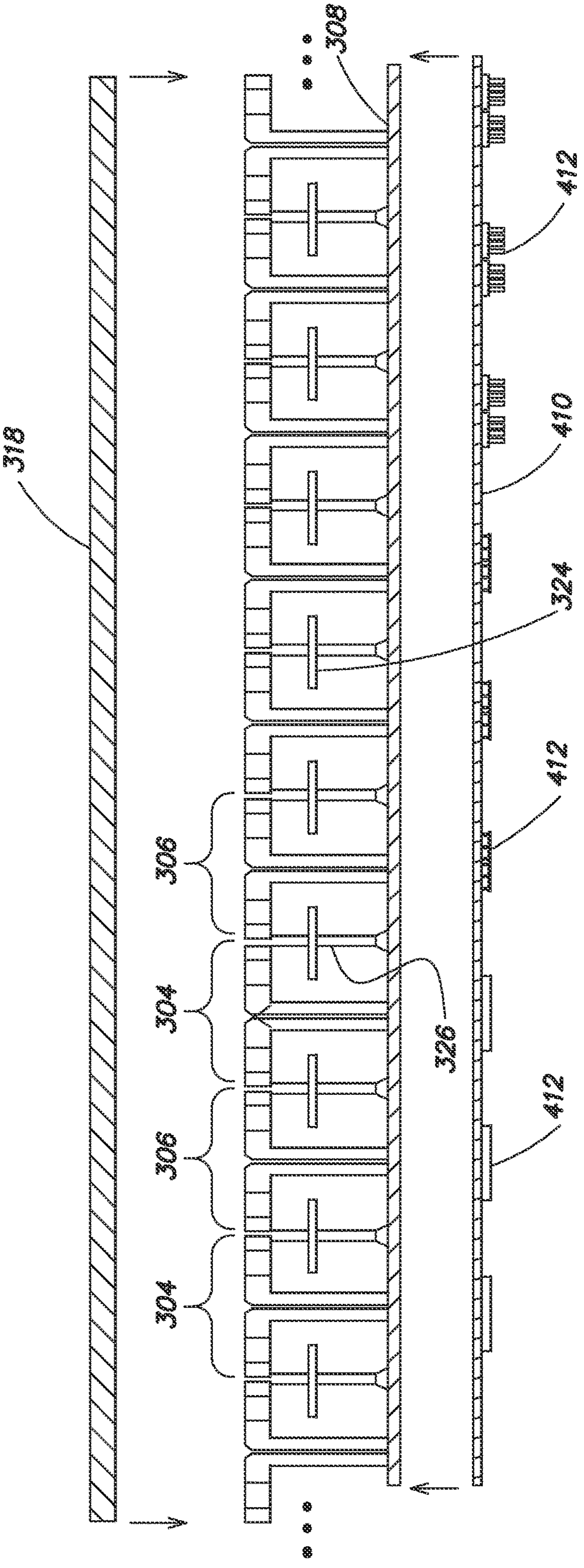
FIG. 4G is a cross-sectional plan view of the modular antenna of FIG. 3A, in accordance with an example of the present disclosure.

FIG. 4G is a cross-sectional plan view of the modular antenna 300, in accordance with an example of the present disclosure. In some examples, a circuit board 410 can be attached at or to the ground plane 308, such as shown in FIG. 4G. The circuit board 410 can be configured to provide signal paths between the various components of the modular antenna array, such as the first feedline 304*c*, 306*c*, the second feedline 304*d*, 306*d*, and/or the H-wall 314 of each component antenna 300. The circuit board can include terminations or other connectors 412.

Further Examples

The following examples pertain to further examples, from which numerous permutations and configurations will be apparent.

Example 1 provides an antenna assembly including an antenna feed configured to receive a signal over a wide bandwidth; a ground plane; an antenna element including a first conductive dipole arm in planar alignment with a surface of the ground plane and a second conductive dipole arm in planar alignment with the surface of the ground plane, parallel and adjacent to the first conductive dipole arm; a conductive wall ("H-wall") in electrical communication with the ground plane and having an end adjacent to, and physically separate from, the second conductive dipole arm, an axial length of the H-wall being orthogonal to the ground plane; and a resistive surface between the ground plane and the antenna element, the resistive surface being wideband or frequency selective to attenuate the signal passing through the resistive surface along a reflective path between an aperture and the ground plane.

Example 2 includes the subject matter of Example 1, further including a first feedline in electrical communication with the first conductive dipole arm and the antenna feed; and a second feedline in electrical communication with the second conductive dipole arm and the antenna feed.

Example 3 includes the subject matter of Example 2, further including at least one non-conductive structural support element between the ground plane and the first feedline, the second feedline, or both.

Example 4 includes the subject matter of Example 3, wherein the at least one non-conductive structural support includes a dielectric foam or resin.

Example 5 includes the subject matter of any one of Examples 2-4, further including a third conductive dipole arm in planar alignment with the surface of the ground plane, perpendicular and adjacent to the second conductive dipole arm; a fourth conductive dipole arm in planar alignment with the surface of the ground plane, parallel and adjacent to the third conductive dipole arm; a third feedline in electrical communication with the third conductive dipole arm and the antenna feed; and a fourth feedline in electrical communication with the fourth conductive dipole arm and the antenna feed.

Example 6 includes the subject matter of Example 5, wherein the end of the H-wall is further adjacent to, and physically separate from, the third conductive dipole arm.

Example 7 includes the subject matter of any one of Examples 5 and 6, wherein the third conductive dipole arm is perpendicular to the second conductive dipole arm.

Example 8 includes the subject matter of any one of Examples 5-7, wherein the first conductive dipole arm is parallel to the second conductive dipole arm, and wherein the fourth conductive dipole arm is parallel to the third conductive dipole arm.

Example 9 includes the subject matter of any one of Examples 5-8, wherein the first and second conductive dipole arms are linearly polarized with respect to a first plane of polarization, wherein the third and fourth conductive dipole arms are linearly polarized with respect to a second plane of polarization, and wherein the first plane of polarization is orthogonal to the second plane of polarization.

Example 10 includes the subject matter of any one of Examples 1-9, further including an integral element additively manufactured into a single continuous piece of material, the integral element including the ground plane, the first conductive dipole arm, the second conductive dipole arm, and the H-wall.

Example 11 includes the subject matter of Example 10, wherein the integral element includes an electrically conductive material.

Example 12 includes the subject matter of Example 10, wherein the integral element includes a non-conductive material plated with an electrically conductive material.

Example 13 includes the subject matter of any one of Examples 1-12, wherein the aperture is configured to provide a greater than 10:1 bandwidth ratio.

Example 14 provides an antenna assembly method including additively manufacturing an integral element as a single continuous piece of material, the integral element including: an antenna feed configured to receive a signal over a wide bandwidth; a ground plane; a first conductive dipole arm in planar alignment with a surface of the ground plane; a second conductive dipole arm in planar alignment with the surface of the ground plane, parallel and adjacent to the first conductive dipole arm; and a conductive wall ("H-wall") in electrical communication with the ground plane and having an end adjacent to, and physically separate from, the second conductive dipole arm, an axial length of the H-wall being orthogonal to the ground plane; and attaching a resistive surface to the integral element, the resistive surface having a wideband or frequency selective attenuation effect on the signal passing through the resistive surface along a reflective path between an aperture and the ground plane.

Example 15 includes the subject matter of Example 14, wherein the integral element further comprises: a first feedline in electrical communication with the first conductive dipole arm and the antenna feed; and a second feedline in electrical communication with the second conductive dipole arm and the antenna feed.

Example 16 includes the subject matter of Example 15, the method further including attaching at least one non-conductive structural support element between the ground plane and the first feedline, the second feedline, or both.

Example 17 includes the subject matter of Example 15, wherein the at least one non-conductive structural support includes a dielectric foam or resin.

Example 18 includes the subject matter of any one of Examples 15-17, wherein the integral element further comprises: a third conductive dipole arm in planar alignment with the surface of the ground plane, perpendicular and adjacent to the second conductive dipole arm; a fourth conductive dipole arm in planar alignment with the surface of the ground plane, parallel and adjacent to the third conductive dipole arm; a third feedline in electrical communication with the third conductive dipole arm and the antenna feed; and a fourth feedline in electrical communication with the fourth conductive dipole arm and the antenna feed.

Example 19 includes the subject matter of any one of Examples 14-18, wherein the integral element includes an electrically conductive material.

Example 20 includes the subject matter of any one of Examples 14-19, wherein the integral element includes a non-conductive material plated with an electrically conductive material.

Numerous specific details have been set forth herein to provide a thorough understanding of the examples. It will be understood, however, that other examples may be practiced without these specific details, or otherwise with a different set of details. It will be further appreciated that the specific structural and functional details disclosed herein are representative of examples and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims. Furthermore, examples described herein may include other elements and components not specifically described, such as electrical connections, signal transmitters and receivers, processors, or other suitable components for operation of the modular antenna.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and examples have been described herein. The features, aspects, and examples are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. An antenna assembly comprising:

an antenna feed configured to receive a signal over a wide bandwidth;

a ground plane;

an antenna element including a first conductive dipole arm in planar alignment with a surface of the ground plane and a second conductive dipole arm in planar alignment with the surface of the ground plane, parallel and adjacent to the first conductive dipole arm;

a conductive wall ("H-wall") in electrical communication with the ground plane and having an end adjacent to, and physically separate from, the second conductive dipole arm, an axial length of the H-wall being orthogonal to the ground plane; and a resistive surface between the ground plane and the antenna element, the resistive surface being wideband or frequency selective to attenuate the signal passing through the resistive surface along a reflective path between an aperture and the ground plane.

2. The antenna assembly of claim 1, further comprising:

a first feedline in electrical communication with the first conductive dipole arm and the antenna feed; and a second feedline in electrical communication with the second conductive dipole arm and the antenna feed.

3. The antenna assembly of claim 2, further comprising at least one non-conductive structural support element between the ground plane and the first feedline, the second feedline, or both.

4. The antenna assembly of claim 3, wherein the at least one non-conductive structural support includes a dielectric foam or resin.

5. The antenna assembly of claim 2, further comprising:

a third conductive dipole arm in planar alignment with the surface of the ground plane, perpendicular and adjacent to the second conductive dipole arm;

a fourth conductive dipole arm in planar alignment with the surface of the ground plane, parallel and adjacent to the third conductive dipole arm;

a third feedline in electrical communication with the third conductive dipole arm and the antenna feed; and a fourth feedline in electrical communication with the fourth conductive dipole arm and the antenna feed.

6. The antenna assembly of claim 5, wherein the end of the H-wall is further adjacent to, and physically separate from, the third conductive dipole arm.

7. The antenna assembly of claim 5, wherein the third conductive dipole arm is perpendicular to the second conductive dipole arm.

8. The antenna assembly of claim 7, wherein the first conductive dipole arm is parallel to the second conductive dipole arm, and wherein the fourth conductive dipole arm is parallel to the third conductive dipole arm.

9. The antenna assembly of claim 5, wherein the first and second conductive dipole arms are linearly polarized with respect to a first plane of polarization, wherein the third and fourth conductive dipole arms are linearly polarized with respect to a second plane of polarization, and wherein the first plane of polarization is orthogonal to the second plane of polarization.

10. The antenna assembly of claim 1, further comprising an integral element additively manufactured into a single continuous piece of material, the integral element including the ground plane, the first conductive dipole arm, the second conductive dipole arm, and the H-wall.

11. The antenna assembly of claim 10, wherein the integral element includes an electrically conductive material.

12. The antenna assembly of claim 10, wherein the integral element includes a non-conductive material plated with an electrically conductive material.

13. The antenna assembly of claim 1, wherein the aperture is configured to provide a greater than 10:1 bandwidth ratio.

14. An antenna assembly method comprising:

additively manufacturing an integral element as a single continuous piece of material, the integral element including:

an antenna feed configured to receive a signal over a wide bandwidth;

a ground plane;

a first conductive dipole arm in planar alignment with a surface of the ground plane;

a second conductive dipole arm in planar alignment with the surface of the ground plane, parallel and adjacent to the first conductive dipole arm; and a conductive wall ("H-wall") in electrical communication with the ground plane and having an end adjacent to, and physically separate from, the second conductive dipole arm, an axial length of the H-wall being orthogonal to the ground plane; and attaching a resistive surface to the integral element, the resistive surface having a wideband or frequency selective attenuation effect on the signal passing through the resistive surface along a reflective path between an aperture and the ground plane.

15. The antenna assembly method of claim 14, wherein the integral element further comprises:

a first feedline in electrical communication with the first conductive dipole arm and the antenna feed; and a second feedline in electrical communication with the second conductive dipole arm and the antenna feed.

16. The antenna assembly method of claim 15, further comprising attaching at least one non-conductive structural support element between the ground plane and the first feedline, the second feedline, or both.

17. The antenna assembly method of claim 16, wherein the at least one non-conductive structural support includes a dielectric foam or resin.

18. The antenna assembly method of claim 15, wherein the integral element further comprises:

a third conductive dipole arm in planar alignment with the surface of the ground plane, perpendicular and adjacent to the second conductive dipole arm;

a fourth conductive dipole arm in planar alignment with the surface of the ground plane, parallel and adjacent to the third conductive dipole arm;

a third feedline in electrical communication with the third conductive dipole arm and the antenna feed; and a fourth feedline in electrical communication with the fourth conductive dipole arm and the antenna feed.

19. The antenna assembly method of claim 14, wherein the integral element includes an electrically conductive material.

20. The antenna assembly method of claim 14, wherein the integral element includes a non-conductive material plated with an electrically conductive material.

* * * * *